Sept. 10, 1940.  F. J. RAYBOULD  2,214,177
COUPLING AND JOINT FORMED THEREBY
Filed March 29, 1939  2 Sheets-Sheet 1

INVENTOR
Frank J. Raybould
By Stebbins, Blenko
& Parmelee
attorneys

Sept. 10, 1940.   F. J. RAYBOULD   2,214,177
COUPLING AND JOINT FORMED THEREBY
Filed March 29, 1939   2 Sheets-Sheet 2
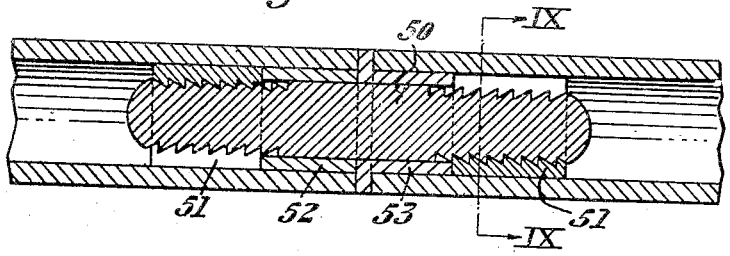
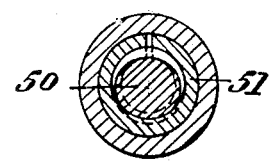
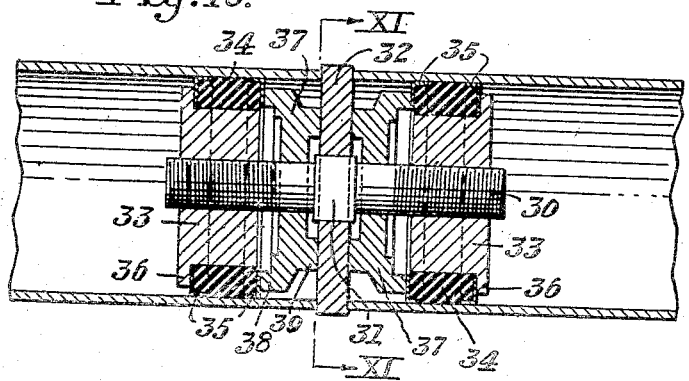
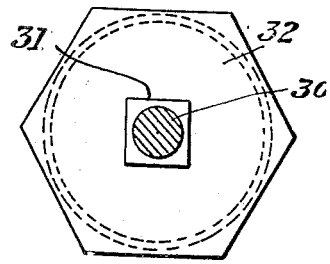
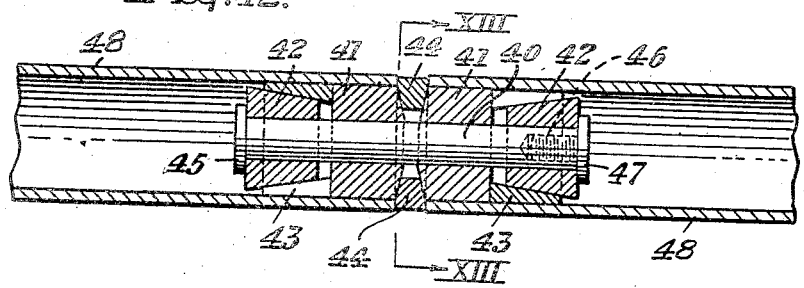
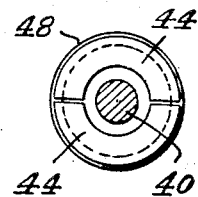
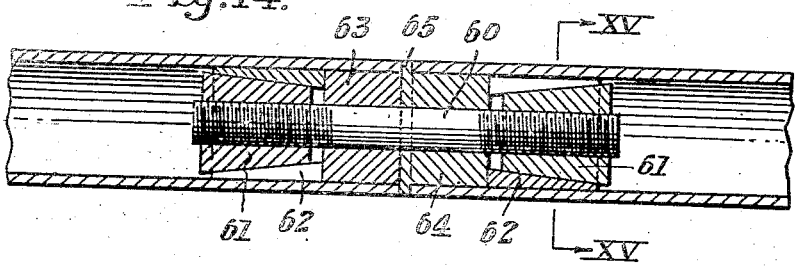
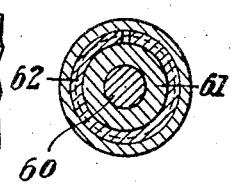
INVENTOR
Frank J. Raybould Patented Sept. 10, 1940

2,214,177

UNITED STATES PATENT OFFICE 2,214,177

COUPLING AND JOINT FORMED THEREBY

Frank J. Raybould, Erie, Pa., assignor to Raybould Coupling Company, Meadville, Pa., a corporation of Pennsylvania Application March 29, 1939, Serial No. 264,754

6 Claims. (Cl. 287—127)

The present invention relates generally to couplings and joints formed thereby and more particularly to couplings for internally joining together adjacent sections of tubes or conduits. This application is a continuation-in-part of my copending application Serial No. 207,736, filed May 13, 1938.

In many installations it is desirable to utilize a coupling which is of such character that a tight and substantially permanent joint can be effected between tubes or conduits without any portion or any substantial portion of the coupling members appearing on the outside of the tubes or conduits. Heretofore various attempts have been made to provide a coupling of this character but so far as I am aware none of them have been successful and as a consequence it has been necessary to resort to welding of the abutting tube ends in order to provide the desired type of joint therebetween. The welding operation is a rather expensive one and frequently leaves an unsightly connection between tubes which must be cleaned and deburred. This cleaning and deburring operation adds appreciably to the installation cost and it is impractical in many types of installations to effect such a joint at the point where the installation is to take place. Furthermore, it is not possible to satisfactorily weld certain types of tubes or conduits in general use at the present time such as aluminum tubes and other types of thin-walled tubes. It has also been proposed heretofore to effect a joint between abutting or adjacent tube ends by mounting a stud or rod within the tubes and then driving pins through appropriately positioned openings in the tubes and in the internal pin. The driven pins are then sheared off at the surface of the tube members so as to prevent a smooth joint. This type of joint is not particularly satisfactory for thin metal tubing or for tubing made of a relatively soft metal. In addition it forms a connection between the tubes which cannot readily be broken in order to separate the tubes. This latter objection also applies to the welded joints between abutting tube ends.

Couplings of this type, that is, couplings which form the joint interiorly of the tubes or conduits, are especially desirable in transmission lines. For example, in the radio broadcasting art coaxial transmission lines or concentric bus lines utilizing an inner conductor held in place by properly spaced insulators and an outer tubular shield have been found highly desirable. This type of high frequency coaxial line utilized from the transmitter to the antenna has many advantages over the generally used bare overhead line from both electrical and mechanical standpoints. The question of expansion and contraction of such transmission lines is of substantial importance and, as a consequence, the majority of the copper coaxial lines which have been utilized heretofore have been placed underground. Buried lines have disadvantages as it is necessary to dig them up in order to clear any trouble which may develop therein. Prior art types of couplings for coaxial lines of this character have been found entirely unsuitable, and it was not until the making of the present invention that the use of suitable exposed coaxial transmission lines of this character were made available to the broadcasting industry. The joints between the tubes have to be of such character as to provide a smooth connection with nothing extending above the surface thereof. The present invention has solved the problem of providing a suitable connection which will permit the outside diameter of the tubular conductor to be the same throughout the entire length of the line.

In accordance with the present invention I provide an internal coupling which will permit the formation of a satisfactory permanent but nevertheless disengageable connection between tubular members. The coupling which I provide permits expeditious forming of the joint and permits the formation of the joint at any place where the installation is to be effected. It is also of such character that the tubes may be brought end to end or spaced with a small ferrule and tightly held in place. The coupling will indefinitey maintain a tight joint between the tubular members but nevertheless it is of such character that they may be separated at any desired time. The junction between the tubes may be made absolutely smooth and practically unnoticeable. It is also of such character that it can be manufactured economically and will result in a very substantial saving in the cost of forming joints of the character in question.

In some instances it is desirable to couple the tubes internally but to nevertheless permit a liquid or gas to flow through the tubes. Where a welded joint is formed between the tubes the joint will not materially obstruct the flow of fluid. However, in all of the internal couplings provided heretofore the passage through the tubes has been completely obstructed. In accordance with the present invention an internal coupling is provided which will permit the flow of fluid through the tubes although the flow therethrough will be necessarily somewhat restricted.

Another important feature of the couplings provided by my invention is that the connection between the coupling members and both of the tubes being joined can be simultaneously effected. This is of substantial advantage in practically all installations embodying internal couplings because it permits equalization of the pressures exerted on the two tubes by the coupling. This is of particular advantage where thin-walled tubes are employed and where unequal forces may tend to cause failure of the coupling in use.

While I have referred to the use of my couplings for connecting together tubes, it will be understood that my invention is not limited to the formation of joints between cylindrical members. The couplings which I provide are applicable to cylindrical, square or polygon shaped conduits or tubes. They are also applicable in any environment where it is desirable to provide an internal joint between two abutting or adjacent members.

In the accompany drawings I have shown for purposes of illustration only several embodiments of my invention. In the drawings—

Figure 8 is a section along a diameter of a joint formed with a further modified form of my coupling;

Figure 9 is a section taken along the line IX—IX of Figure 8;

Figure 10 is a section showing a further modification of my invention;

Figure 11 is a section taken along the line XI—XI of Figure 10;

Figure 12 is a section showing a further modified form of my invention;

Figure 13 is a section taken along the line XIII—XIII of Figure 12;

Figure 14 is a section through a further modification of my invention; and

Figure 15 is a section taken along the line XV—XV of Figure 14.

Figure 1:
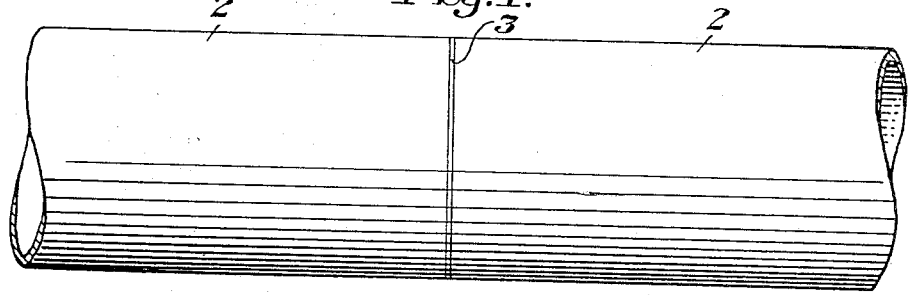
Figure 1 is an elevation showing two cylindrical tubes joined together with a coupling embodying the present invention.
Figure 2:
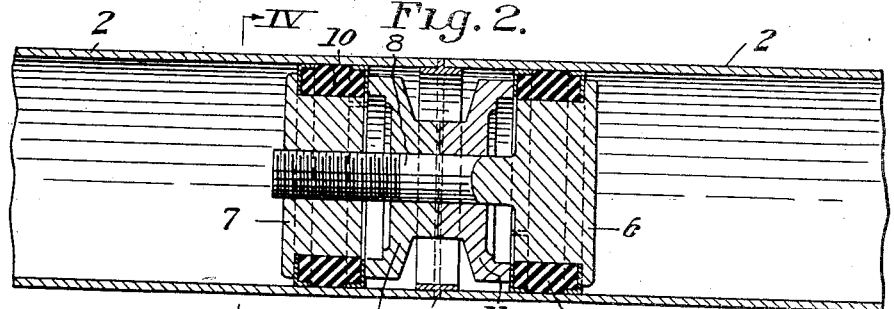
Figure 2 is a section taken along a diameter of the structure shown in Figure 1.
Figure 3:
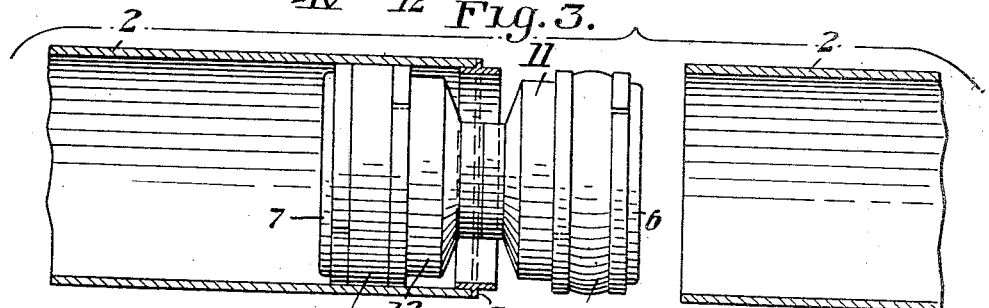
Figure 3 is a view showing the tubes to be joined in section and the coupling member in elevation.
Figure 4:
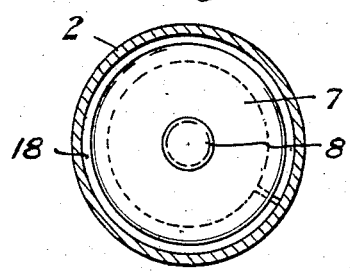
Figure 4 is a section taken along the line IV—IV of Figure 2.

Referring to the embodiment shown in Figures 1 to 5, inclusive, the tubes 2 are joined together in such manner that the entire coupling is within them. A thin ferrule 3 spaces the tube ends from each other to a slight extent, although it will be obvious that the joint may be formed without the use of ths spacing member. The joint is formed by a coupling member which is expansible into tight contact with the internal walls of the tubes. The coupling member comprises a collar 6, a second collar 7, a threaded stud 8 which is integral with or secured to the collar 6, an expansible ring 9 carried by the collar 6, a similar expansible ring 10 carried by the collar 7, a follower ring 11 cooperating with the expansible ring 9 and a similar follower ring 12 cooperating with the ring 10. These expansible rings are adapted to be contracted axially and expanded radially into tight engagement with the inner walls of the tubes.

The expansible ring 9 is mounted on the collar 6 in abutting relationship with respect to a flange 13 carried by the collar. The expansible ring 12 is similarly mounted on the collar 7 in abutting relationship with respect to the flange 14 carried thereby. The follower rings 11 and 12 are provided with axial openings for receiving the stud 8. They are also provided with projections 15 and 16, respectively, arranged to bear against the expansible rings. Split metallic bushings 17 are mounted on the expansible ring 9 to confine the expansible ring against extrusion laterally of the joint and to provide bearing surfaces for cooperation with the flange 13 on the collar 6 and the projection 15 on the follower ring 11. Similar split bushings 18 are mounted on the expansible ring 10.

The collar 7 has an interiorly threaded opening 19 therethrough for cooperation with the threaded portion 20 of the stud 8. When the parts are assembled in the relationship shown in Figure 2 and indicated in Figure 5, relative rotation of the collars 6 and 7 will cause the follower rings to abut each other and the follower rings will in turn exert axial pressure on the expansible rings 9 and 10. This results in a compression of the rings axially of the joint and an expansion thereof radially so as to bring them into tight engagement with the tubes. In forming the joint the parts of the coupling member are threaded together and the one expansible ring expanded to a sufficient extent to provide friction between it and the tube in which it is to be inserted. It is then inserted in the tube and the other tube is then brought into position over the other expansible ring. This ring has been expanded to a similar extent and consequently there will be friction between it and the tubes placed thereon. The tubes are brought into tight engagement with the ferrule 3 and then rotated. This rotation pulls the collars towards each other and expands the expansible rings into tight engagement with the inner walls of the tubes.

I have found that a very strong joint can be formed in this manner and that it will remain intact substantially indefinitely. Nevertheless the joint is of such character that it can be broken without injury to any of the parts at any desired time. I have found that sufficient pressure between the tubes and the expansible rings can be brought about in this manner to rupture the tubes.

Figure 6:
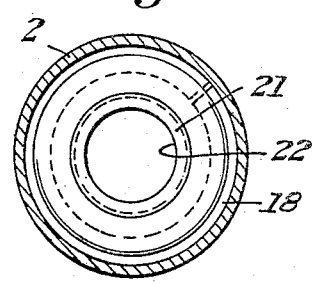
Figure 6 is a section similar to Figure 4 through a modified form of coupling.
Figure 7:
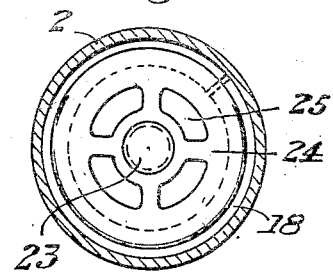
Figure 7 is a section similar to Figure 4 showing a further form of the invention.
Figure 5:
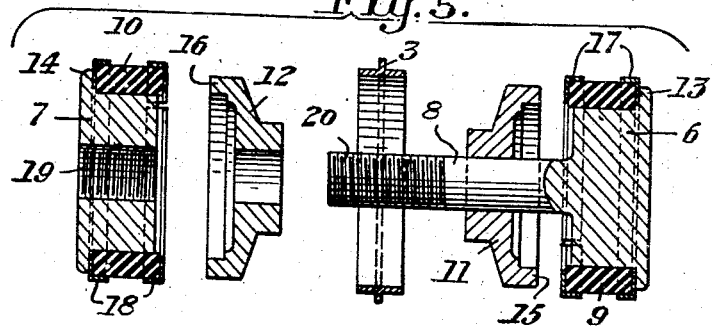
Figure 5 is a section taken along a diameter of the coupling shown in Figures 2 and 3, the various parts being shown in partially disassembled relationship.

In the couplings shown in Figures 1 to 5, inclusive, the collars and the expansible rings completely block the internal cross-sectional area of the tubes. In some installations it is desirable to provide for the passage of fluid through the tubes. In the embodiments shown in Figures 6 and 7 provision is made for the passage of fluids through the couplings. As shown in Figure 6, the threaded stud 21, which corresponds to the threaded stud 8, is enlarged and provided with a central opening 22 therethrough. The collar 6 is also likewise provided with a centrally disposed opening in alinement with the opening 22. As shown in Figure 7 it is not necessary to enlarge the stud and provide the fluid passage therethrough. The stud 23 may be made of usual size and the collars 24 may be cast in the form of webs so as to provide passageways 25 therethrough. The follower rings may likewise be cast in web formation to provide for the flow of fluid through the connection.

In some installations it may be desirable to completely insulate the one tube from the other. This can be very satisfactorily accomplished with a coupling of the character shown in Figures 1 to 5 by making the ferrule of a nonconducting material and by eliminating the bushings on the expansion rings or by making the bushings of a nonconducting material.

It will be apparent that instead of the stud 8 of the embodiment shown in Figures 1 to 5, inclusive, being formed integrally or secured to one of the collars, both ends of the stud may be threaded for cooperation with threaded openings in the collars. With this arrangement both of the collars and the expansible rings carried thereby will be free to rotate on the threaded stud, which may be either hollow or solid. The frictional engagement between the expansible rings and the tubes will be sufficient to cause relative movement between the collars toward each other upon the rotation of the tubes. In a coupling of this character, as well as in the coupling illustrated in Figures 1 to 5, inclusive, substantially equal pressures are exerted by the expansible rings on the tubes and a completely balanced condition obtained.

In some installations it will be impractical to rotate either of the tubes being joined. My invention may be utilized in such installations by providing appropriate means to effect the expansion of a suitable member into tight engagement with the tubes. In Figures 10 to 13, inclusive, I have illustrated embodiments of this character.

In Figure 10 the stud 30 is threaded at each end and the central portion provided with a square section 31. This square section 31 cooperates with a centrally disposed square opening in a hexagonal nut 32. Threaded collars 33 are mounted on the threaded ends of the stud 30 and each collar has mounted thereon an expansible ring 34 provided with appropriate bushings 35. The collars 33 have flanges 36 thereon for preventing the expansible rings from being forced off the collars. A follower ring 37 cooperates with each of the expansible rings. Each follower ring is provided with an extension 38 arranged to bear against an expansible ring. Each follower ring is also provided with a projection 39 arranged to abut the nut 32. It will be apparent that when the tubes are brought into position over the coupling member and the nut 32 rotated, the collars 33 will be pulled toward each other and the follower rings will cause the expansible rings to expand into tight engagement with the tubes. The opposite ends of the stud 30 are oppositely threaded so that rotation of the nut will cause them to be pulled toward each other. As illustrated, the nut 32 extends slightly beyond the outer diameter of the tubes but it will be obvious that the nut may be made of such size as to be positioned below the surfaces of the tubes.

Instead of the nut 32 being hexagonal or some other suitable form in order to permit the use of a tool thereon for rotating it, it may be circular and provided with a hole adapted to receive a small rod or bar or some other suitable tool for rotating it and the stud with which it cooperates.

In the embodiment illustrated in Figure 12, the necessary expansion of the coupling member into intimate contact with the tube walls is effected by a wedging action. In this embodiment the coupling member includes a stud 40, follower rings 41, collars 42, expansible rings 43 and wedges 44. One end of the stud 40 is provided with a flange 45 to hold the adjacent collar thereon. The other end of the stud 40 is provided with a threaded hole for receiving a screw 46 having a relatively large head 47 thereon. This arrangement is provided in order to permit appropriate assembly of the collars and follower rings and expansion rings on the stud. The expansible rings 43, as illustrated, are split metallic rings having a beveled or sloping inner surface. The beveled or sloping inner surface of each expansible ring cooperates with the beveled or sloping outer face of the collar 42 upon which it is mounted. It will be evident that as the follower rings 41 are forced along the stud 40 they will force the expansible rings along the beveled or sloping faces of the collars, thereby expanding the rings into tight engagement with the inner surfaces of the tubes 48. Relative movement of the follower rings 41 is effected by the wedges 44. These wedges 44 are provided with tapered surfaces adapted to cooperate with tapered surfaces on the follower rings 41. As the wedges 44 are driven radially of the connection the beveled faces thereof will force the follower rings apart and effect the desired connection.

In some installations it is desirable to provide an all-metal joint. This condition is met by the coupling illustrated in Figures 12 and 13. It is also met in the couplings illustrated in Figures 8 and 9 and 14 and 15.

In the embodiment shown in Figure 8 the coupling comprises a stud 50, expansible rings 51, a sleeve or follower ring 52, and a similar sleeve or follower ring 53. The ring 53 differs from the ring 52 in that it is provided with a flange arranged to extend upwardly between the two pipe ends to anchor the coupling. The ends of the stud 50 are provided with reverse buttress threads with acute angles engaging with appropriate threads on the inner faces of the split expansible rings 51. After the coupling has been inserted in the tubes, friction between the expansible rings 51 and the tubes will cause rotation of the expansible rings on the stud and the expansible rings will be expanded by the threads into tight contact with the tubes.

In the embodiment shown in Figures 14 and 15 the coupling includes a stud 60, collars 61, expansible rings 62, a follower ring 63, and a second follower ring 64. The follower ring 64 differs from the follower ring 63 in that it is provided with a flange 65 extending outwardly between the two pipe members being joined. The collars 61 are internally threaded for cooperation with threads carried by the stud 60. The outer face of each collar 61 is beveled for cooperation with the beveled face of its cooperating expansible ring 62. It will be evident that when the coupling is appropriately positioned in the tubes and the expansible rings expanded into engagement with the walls of the tubes further rotation thereof will cause the expansible rings to climb up along the collars and effect a tight joint with the tubes.

In the embodiments shown in Figures 8, 12 and 13, the expansible rings are split so as to permit expansion thereof. These rings may be made of metal or any other suitable material.

Instead of using a split expansible ring of this character the expansible ring may be made of soft metal so that it will expand sufficiently when subjected to longitudinal forces to bring it into tight engagement with the tubes.

It will be apparent from the detailed description given above that the coupling which I provide possesses the very desirable features and advantages set forth above. In addition to these advantages appropriate tests show that connections made with couplings of the above character can very satisfactorily be used in electric transmission lines of all sorts because the electrical losses through the coupling are so small as to be completely negligible.

While I have shown and described several embodiments of my invention it will be understood that it is not limited to these various embodiments but may be otherwise embodied within the scope of the appended claims.

I claim:

1. An internal coupling for tubes comprising an expansible ring adapted to be positioned in each of the tubes to be joined, and means common to both of said rings and positioned at least partially within said tubes for expanding said rings radially into tight engagement with the tubes.

2. An internal coupling for tubes comprising an expansible ring adapted to be positioned in each of the tubes to be joined, a stud common to both of said rings, a collar for supporting each ring, said collars being mounted on the stud, and means for exerting axial pressure on said rings for expanding them radially into tight engagement with the inner walls of said tubes.

3. A joint comprising two tubes, a collar positioned in each tube, an expansible ring on each collar, and means for expanding said rings into tight engagement with the inner walls of said tubes, the joint having a substantially continuous outer surface of substantially uniform diameter.

4. An internal coupling for tubes comprising a stud adapted to extend into adjacent pipe ends, an expansible ring supported by the stud adjacent each end, and means cooperating with the stud and said rings for simultaneous expansion of the rings into engagement with the inner walls of the pipes extending thereover.

5. An internal coupling for tubes comprising an expansible ring adapted to be positioned within each of said pipe members, and means extending between said rings and adapted to be positioned wholly within said tubes for expanding said rings radially into tight engagement with the tubes.

6. An internal coupling for tubes comprising an expansible ring adapted to be positioned in each of the tubes to be joined, a stud common to both of said rings, and means cooperating with said stud and said rings for expanding the rings radially into tight engagement with the inner walls of the tubes.

FRANK J. RAYBOULD.